(12) United States Patent
Skiba et al.

(10) Patent No.: US 9,378,459 B2
(45) Date of Patent: Jun. 28, 2016

(54) CROSS-DOMAIN TOPIC EXPANSION

(71) Applicant: Avaya Inc., Basking Ridge, NJ (US)

(72) Inventors: David Skiba, Golden, CO (US);
Valentine C Matula, Granville, OH (US); Lee Becker, Boulder, CO (US); George Erhart, Loveland, CO (US)

(73) Assignee: Avaya Inc., Basking Ridge, NJ (US)

( * ) Notice: Subject to any disclaimer, the term of this patent is extended or adjusted under 35 U.S.C. 154(b) by 320 days.

(21) Appl. No.: 13/928,832

(22) Filed: Jun. 27, 2013

(65) Prior Publication Data

US 2015/0006460 A1    Jan. 1, 2015

(51) Int. Cl.
*G06N 5/02* (2006.01)

(52) U.S. Cl.
CPC ...................... *G06N 5/022* (2013.01)

(58) Field of Classification Search
CPC ........................................... G06N 5/022
See application file for complete search history.

(56) References Cited

U.S. PATENT DOCUMENTS

| 8,224,901 | B2 | 7/2012 | Hind | |
| 2002/0023144 | A1* | 2/2002 | Linyard et al. | 709/218 |
| 2007/0239760 | A1* | 10/2007 | Simon | 707/102 |
| 2008/0195378 | A1* | 8/2008 | Nakazawa et al. | 704/9 |
| 2010/0076998 | A1* | 3/2010 | Podgorny et al. | 707/772 |
| 2014/0120513 | A1* | 5/2014 | Jenkins | G06F 17/27 434/362 |

* cited by examiner

*Primary Examiner* — Alan Chen
(74) *Attorney, Agent, or Firm* — Sheridan Ross P.C.

(57) ABSTRACT

Automated method and systems are provided for determining a gap exists in an enterprise's knowledge base. Once a gap is determined, a question is developed in accord with the gap. An answer is then developed to answer the question and the knowledge base is updated accordingly. The source of the information may be cross-domain information such that an enterprise may include relevant information, and/or more usable information, than what could be otherwise provided by information limited to the enterprise's domain.

20 Claims, 3 Drawing Sheets

CROSS-DOMAIN TOPIC EXPANSION

TECHNICAL FIELD

The embodiments herein are generally directed towards customer service operations and, more particularly, to automated systems for developing and presenting answers to common or anticipated questions.

BACKGROUND

Many enterprises utilize frequently asked questions ("FAQ" or "FAQs") as a ready source of information to users seeking information about the enterprise. Many inquires may be promptly and efficiently addressed to the satisfaction of both the user and the enterprise.

While FAQs may be effective and efficient tools to address many inquires, the users may still have questions that require interacting with an agent.

SUMMARY

It is with respect to the above issues and other problems that the embodiments presented herein were contemplated. More specifically, embodiments of the present disclosure provide, inter alia, the ability to automatically identify gaps in an enterprise's customer service coverage (e.g., FAQ coverage, automated responses for an IVR system, agent scripts, etc.) and then automatically develop answer(s) to address the identified gaps. The present disclosure also provides the ability to continually update customer service coverage based on evolving trends in successful customer service coverage, unsuccessful customer service coverage, and identification of trends across domains.

In a first step, the system (e.g., via an automated coverage assistant module) automatically identifies an enterprise's current customer service coverage. This step is an inventory step where the coverage assistant module determines a list of current FAQs and answers thereto, an inventory of current interactive voice response ("IVR") scripts, and an inventory of current agent scripts or script topics. Often, the current coverage has a certain amount of enterprise-specific language associated therewith. For example, a mortgage broker will likely have current coverage with terms like "refinance", "new loans", "reverse mortgage", etc.

In a second step, the coverage assistant module begins the process of identifying weakness in the enterprise's coverage. This step may include analyzing a competitor's coverage, looking at absolute failures in customer service (e.g., questions that resulted in poor customer satisfaction), looking at cross-domain coverage (e.g., a hotel can look at current coverage for an airline to determine if an event is occurring with the airline that might affect the hotel—such as flight delays, flight cancellations, etc.). Another possible way of identifying coverage weaknesses is to analyze a dictionary (e.g., all words in the English language) and compare that with words used in the enterprise's domain. If the word occurrence is higher in the domain than in English (meaning that the topic occurs in discussions more frequently within the domain than outside the domain) and no coverage is devoted to the topic, then a potential gap in coverage can be inferred. Still another possible way of identifying coverage gaps is to monitor news feeds from trusted sources (e.g., AP tweets, keyword spikes on a trusted social website, FCC alerts, National Weather alerts, etc.).

In a third step, once the gaps in coverage have been identified, then questions directed toward those gaps are created. The manner in which questions are created may depend upon the manner in which the gap was identified. For instance, if a gap was detected by identifying absolute failures in customer service, then the question(s) that preceded the absolute failure may be identified. As another example, if an analysis of cross-domain coverage or a competitor's coverage identifies a question that is not addressed in current coverage, then those questions may be copied or re-worded to specifically apply to the enterprise in question.

In the fourth step, answers to the questions identified in the third step are generated (i.e., the coverage begins to expand). This step may be performed in a number of different ways. As one example, the question(s) can be crowd sourced and most common answers or "best" answers as determined by the crowd may be the model upon which the eventual coverage is based. As another example, a first answer may be used as the initial answer and then that first answer may be modified as additional answers are created to the same or similar questions. This modification of the answer may continue indefinitely or until a model answer is approved by a supervisor, for example.

In a fifth step, the answer(s) are added to the enterprise's coverage. These answers may be dynamically updated as appropriate or removed once they become irrelevant.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Furthermore, while embodiments of the present disclosure will be described in connection with queued or attempted users of a contact center, it should be appreciated that embodiments of the present disclosure are not so limited. In particular, embodiments of the present disclosure can be applied to any contact center construct and, in some embodiments, may also be utilized in non-contact center settings. For instance, any communication system whereby one or more elements are queued may benefit from the teachings herein. The usage of contact center examples is for illustrative purposes only and should not be construed as limiting the claims.

In the figures herein, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

Figure 1:
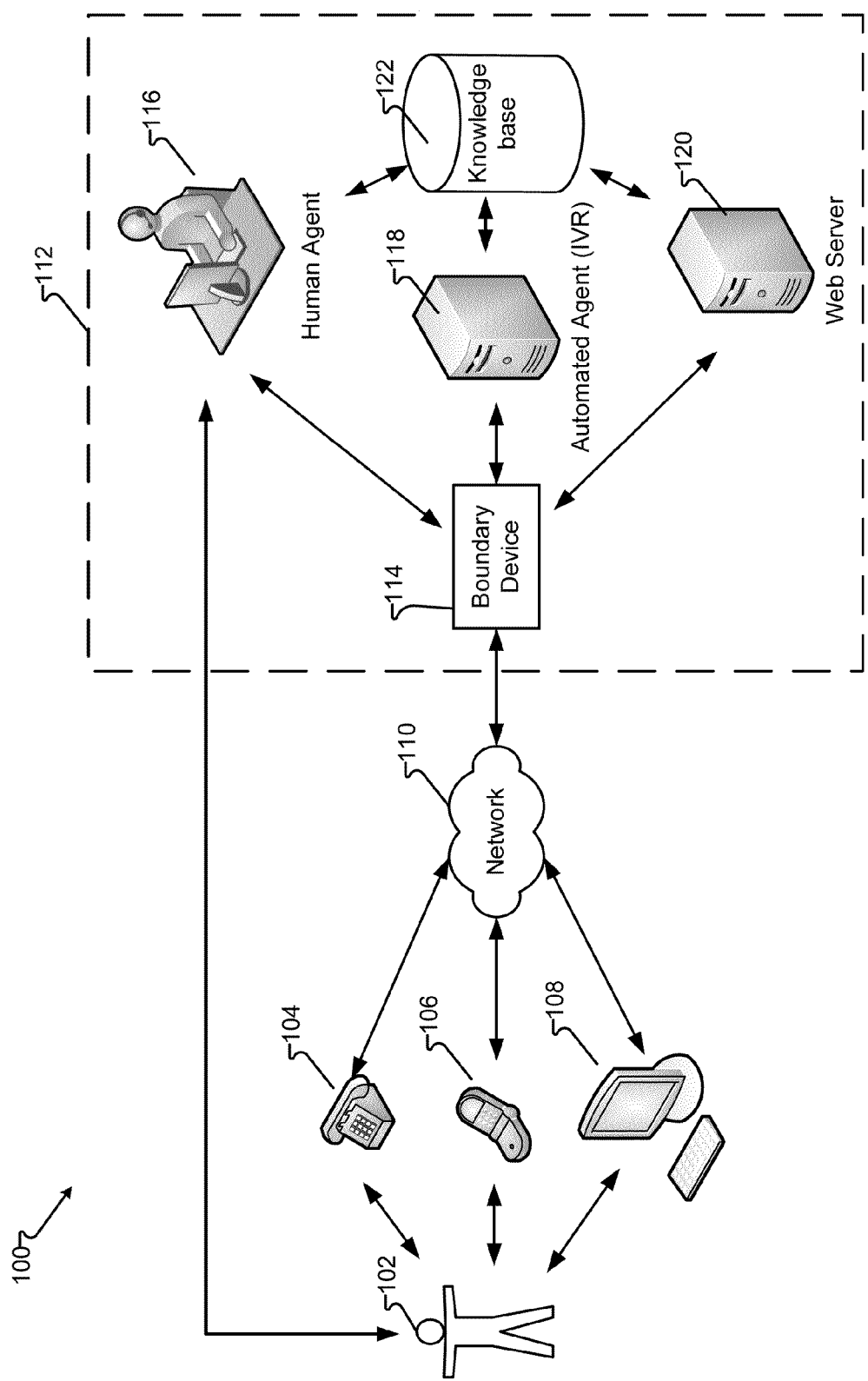
FIG. 1 is a block diagram of a communication system in accordance with embodiments of the present disclosure.

FIG. 1 is a block diagram of communication system 100 in accordance with embodiments of the present disclosure. In one embodiment, user 102 is seeking information from enterprise 112 and may utilize a number of devices to communicate with enterprise 112. Devices may include a landline 104 (e.g., plain-old-telephone system ("POTS") telephone), cellular telephone 106, and personal computer 108 running a web browser, video, audio or text chat application. User 102 may use other devices (not shown), including, but are not limited to, smart phone, VOIP phone, web browser on a web enabled device, and so on. In another embodiment, user 102 may personally visit the enterprise and directly speak to agent 116. Personal visits to enterprise 112 may also afford user 102 the opportunity to use a kiosk, direct-connect telephone, terminal, or other resource to access information.

User 102 utilizing a device, such as telephone 104, cellular telephone 106 and/or personal computer 108 will connect to enterprise 112 via a network, such as a telephone network, cellular network, the Internet, or combinations thereof. Boundary device 114 provides services such as accepting calls, firewalls, and/or routing of calls. Other equipment may also be used in the receiving and routing of contacts received by enterprise 112.

User 102 may then establish a session with human agent 116, automated agent, such as an interactive voice response ("IVR") server, web server 120, and/or other resources operable to provide answers or information to user 102. Resources, such as human agent 116, automated agent 118, and web server 120, may then access knowledge base 112 as a source for the information to be provided to user 102.

Knowledge base 112 is variously embodied. Knowledge base 112 may be quite small, such as a component of a file, or it may be substantial and comprise a vast number of records, files, databases, and/or datacenters. Maintaining prior art knowledge bases is a labor intensive process and prone to inaccuracies and inefficiencies but if not done, the information becomes stale and errors and omissions are not addressed.

Figure 2:
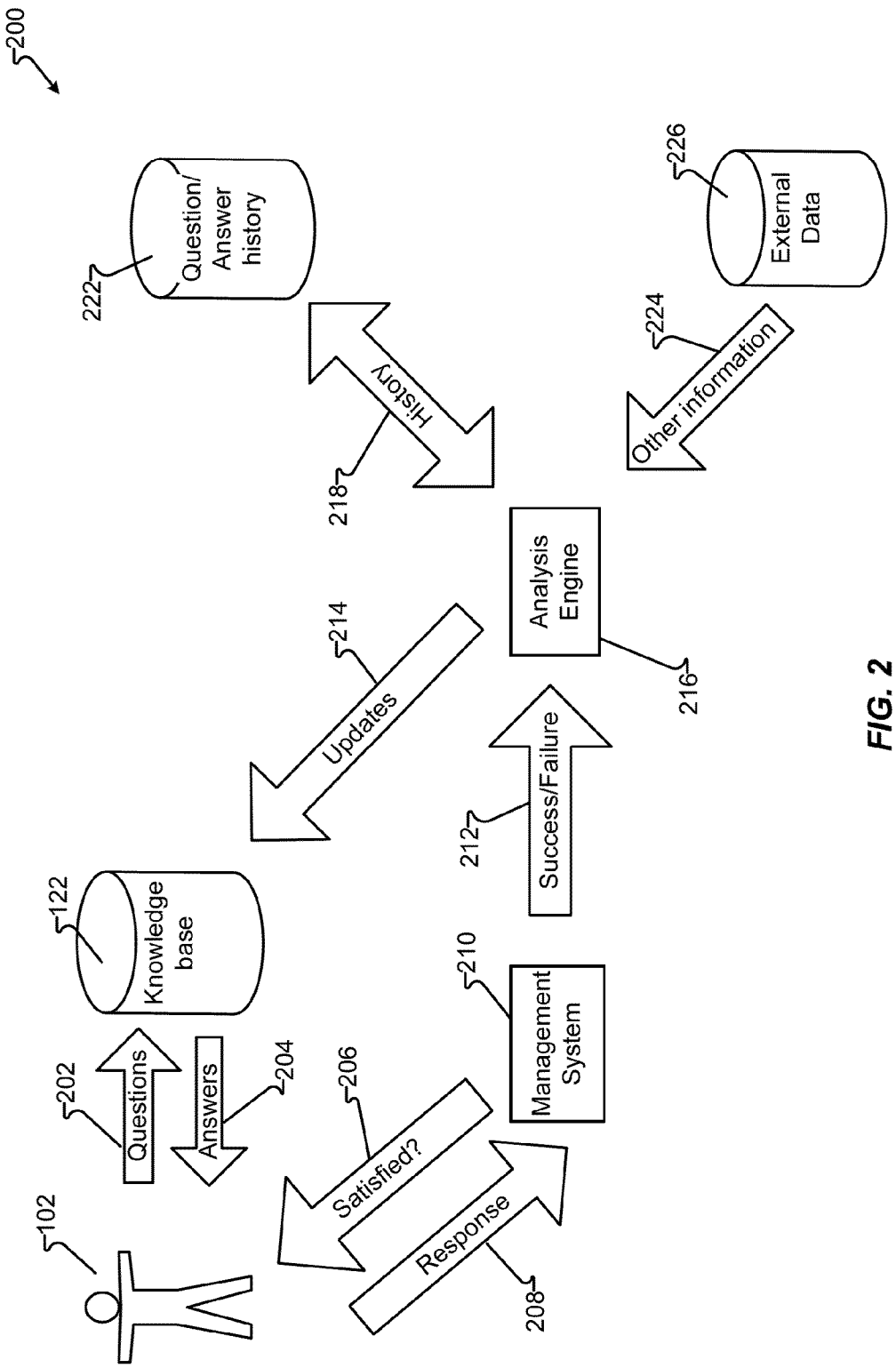
FIG. 2 illustrates a data flow diagram of a knowledge base updating process, in accordance with embodiments of the present disclosure.

FIG. 2 illustrates data flow diagram 200 of a knowledge base updating process. In one embodiment, an inventory of current information is ascertained, gaps in the current information is identified, questions are generated in accord with the gaps, answers are then created to the questions, the information is updated, and ongoing maintenance is provided to remove outdated information. In another embodiment, one or more of the foregoing are reordered and/or processed concurrently.

In another embodiment, an internal method of identifying gaps is provided, such as by user 102 submitting or asking question 202. Question 202 may include searches, structured or freeform queries, browsing, asking a human or IVR agent a question, or other means to solicit answer 204. Knowledge base 122 then provides answers 204 to user 102.

User 102 may receive answer 204 that is correct and precisely answers question 202 or varying levels of success or failure thereof. For example, user 102 may ask question 202 and knowledge base 122 may respond with various responses (e.g., answers 204). Answers 204 may include an indication that the question was not understood, an incomplete answer, an irrelevant answer, a partial answer, a wrong answer, and the like.

In one embodiment, management system 210 inquires 206 as to user 102's satisfaction with answer 204 and receives response 208 indicating the degree and/or other attributes of user 102's experience and/or information received by answer 204. In other embodiments, management system 210 indirectly asks user 102 and indirectly receives response 208. For example, management system 210, when implemented in enterprise 112 as a contact center may employ voice analysis devices such as to listen for key words (e.g., "you are not understanding," "that answered my question," etc.) or voice stress analysis or other attributes of the voice of user 102 that may indicate satisfaction, anger, frustration or other emotion that may directly or indirectly indicate satisfaction or dissatisfaction with answer 204.

Analysis engine 216 may then be presented with success factors 212 of the success or failure, or success and failure, of answer 204 and/or comprehension of question 202. Analysis engine 216 may then identify the subject of question 202 or the specifics of question 202 as a gap in enterprise 112's knowledge base 122. In a further embodiment, analysis engine 216 may send question 202, answer 204 and/or success factor 212 as history 218 to a question/answer history database 222. Question/answer history 222 may then hold the results of any one or more question 202, answer 204 and success factor 212 and, as a benefit, provide a history or trend information to analysis engine 216.

By way of example, such as when enterprise 112 is a clothing retailer, user 102 asks question 202 related to locating in-stock parkas of a particular retail outlet during the summer. Retailer enterprise 112 may have assumed a lack of demand for parkas and removed them in favor of summer clothing. As a result, answer 204 may be unsatisfactory to user 102, such as by indicating parkas are not available. As another example, user 102 may ask question 202 to locate a particular product not carried by retailer enterprise 112 and similarly receive answer 204 which is deemed unsatisfactory to user 102. Management system 210 inquired 206 as to user 102's satisfaction and received response 208, which in turn was made available to analysis engine 216 via success factor 212. Analysis engine 216 sends the history 218 to question/answer history 222. If analysis engine 216 fails to encounter another question 202 and/or another success factor 212 indicating dissatisfaction, then analysis engine 216 may take no further action. However, based on user 102's dissatisfaction with a single answer or a plurality of answers associated with one or more users 102, as determined, in part, by policies of enterprise 112, a gap may be determined. When considering a trend or history, question/answer history 222 may be populated with historical questions and answers and satisfaction indicators associated with a word or topic (e.g., the word "parka" or receiving inquiries about a particular product not stocked, or other commonality) and, based on the history, gap may be detected and analysis engine 216 may then attempt to resolve the gap and cause knowledge base 122 to be updated.

Analysis engine 216 may include translation services to provide multilingual equivalents and/or alternative phrasing (e.g., "parka" may be considered as equivalent to "winter coat," "ski jacket," and so on).

In addition to the foregoing, whereby a gap in knowledge base 122 is identified, in part, by user 102's interaction with knowledge base 122, other embodiments for the identification of gaps in knowledge base 122 are envisioned herein. In one embodiment, analysis engine 216 may seek gaps from external data 226 and receive other information 224. External data 226 may include competitors within the same industry or domain, other domains such as providers of associated goods or services (e.g., airlines, rental cars, and other travel services providers to hoteliers), trusted sources (e.g., news outlets, governmental agencies, non-governmental agencies), and so on. External data 226 may also include other information maintained by enterprise 112.

Knowledge base 122 may include information with a range of volatility, from substantially static information, such as a physical address of a store, to highly dynamic information, such as information related to seasonal changes, weather, or news events. As a result, analysis engine 216 may determine gaps on an ongoing basis and optionally purge expired or unused information. In another example embodiment, enterprise 112 is a hotelier utilizing external data 226 of an airline to provide cross-domain coverage of a particular topic is determined to be a gap. External data 226 may be the airline's Twitter feed, RSS feed, website, human agent, automated agent, or other source of relevant data to be provided to analysis engine 216 as other information 224.

Furthering the example, analysis engine 216 receives other information 224 from the airline's external data 226 and may then determine a gap exists with regard to a storm near the airline's hub airport. External data 226 may further include the hotel enterprise 112's own reservation system. Therefore, analysis engine 216 may receive airline information (a first, other information 224) and reservation information (a second, other information 224), and determine that gap exists, such as, the number of guests who may wish to extent their stay in the hotel due to delayed flights and the number of guests who may not arrive as scheduled due to the delayed flights.

Cross-domain sources of external data 226 are widely varied as domain-relevant information may be provided by many another domains. The specific source of cross domain information may depend, at least in part, on the industry in which enterprise 112 is engaged. For example, enterprise 112 may be a provider of banking services and relevant cross-domain information may include domestic and international news, governmental actions, financial markets, and the like as a partial list of other information relevant to the operations of banking enterprise 112.

External data 226 may also include sources of generally available information, such as news and weather. The source of information may be governmental or a free and/or fee-based private provider of information.

Once other information 224 is provided to analysis engine 216, a determination of the existence of a gap may be made and, if found, additional processing initiated to resolve the gap. The threshold for what is, and is not, a gap is variously embodied and may be determined by a listing of key words, phrases, or topics. Such thresholds may be subject to enterprise 112's own history and/or interested topics. For example, a bank may take little interest in a gap associated with the word "storm," but upon reaching a threshold of frequency (e.g., a historical trend shows a certain number other information 224 associated with "storm" but the volume of similar messages has doubled), source (e.g., non-weather related external data 226 now discussing "storm"), severity (e.g., "category 3," "watch," "warning," "advisory," "evacuation," and so on) may then cause analysis engine 216 to identify "storm" as a gap. As a result, industries in one domain, such as banking, may identify gaps from cross-domain sources, such as weather.

With a gap in knowledge base 122 identified, analysis engine 216 may then proceed to resolving the gap. In one embodiment, the gap is normalized, such as by rephrasing or aggregating a number of issues. As one example, a gap discovered via a competitors website such as a product for sale or an event. Analysis engine may then copy or rephrase the question. By way of example, enterprise 112 and the competitor are engaged in banking and the competitor is discovered to have a new mortgage product. Analysis engine 216 may then formulate a question in response to the identified gap, for example, "What do we have that competes with the competitor's new mortgage product?"

In another embodiment, a competitor's website may be a source of common misunderstandings of customers. For example, a customer may use a brand name of a competitor when conducting business with enterprise 116. For example, using the phrase "Big Mac," used by the McDonald's corporation, when conducting business with competing company, Wendy's. As a result, a question may be generated, such as, "What is a 'Big Mac' by McDonald's?" In yet another embodiment, the identified gap may be determined from external data 226 being a news source, for example, when outside information 224 is, "Civil disturbances occurring in Country X." One question that may then be generated is, "How will civil disturbances in Country X affect our customers?" In yet another embodiment, a dictionary comparison by analysis engine 216 identifies a lack of coverage in knowledge base 122 for the phrase, "reverse mortgage" and generates a broad question, such as, "Do we have sufficient information on reverse mortgages available?" In other embodiments, the question may be more specific, such as, "What are your reverse mortgage requirements?" or "What are the rates for a reverse mortgage?" In other embodiments, the formation of questions may be less precise, such as by copying all or a portion of other information 224. For example, when external data 226 is the National Weather Service, other information 224 may be, "The National Weather Service has issued a severe storm warning for City Y." As a result, analysis engine may then generate a broad question, such as, "The National Weather Service has issued a severe storm warning for City Y—Action required?" In other embodiments, the question generated may be more specific and related to another domain, such as, "Are there any flight delays for travel to or from City Y?" Or, "How long will my cable, power, or other utility service be out if I live within City Y?"

In another embodiment, analysis engine 216 attempts to resolve the generated question. Analysis engine 216 may attempt to resolve the question through algorithmic, expert systems, fuzzy logic, Internet searches or other machine-based decision making, and/or may serve as a router to other systems and/or personnel to present the question and receive answers therefrom. In one embodiment, analysis engine 216 has determined a gap related to a particular subject matter and generated a question. A search of external data 226 receives other information 224 indicating a particular employee of enterprise 116 has expertise in that particular subject matter and routes the question to that individual. In another embodiment, analysis engine 216 accesses question/answer history 222 to extract related history 218 and finds an identical, or reasonably similar, answer to the question and automatically associates the answer to the question. Analysis engine 216 may also "crowd source" the question and ask a plurality of individuals to answer the question whereby commonality or ranked answer(s) are considered "the" answer to the question. As an option, analysis engine 216 may seek finalization and/or approval of questions and/or answers from a human reviewer/approver prior to making the question/answer available for use by knowledge base 122.

In other embodiment, analysis engine 216 has a question and an answer and updates 214 knowledge base 122, thereby making the information accessible to user 102, directly and/or via intermediary automated and/or human provider.

In another embodiment, knowledge base 122 is updated to remove irrelevant information. In one embodiment, analysis engine 216 may determine a subject is no longer relevant and update knowledge base 122 to remove questions and answers related to the now irrelevant subject matter. In another embodiment, knowledge base 122 may be associated with a date of last access for a number of questions and, if a question has not been accessed for a particular length of time, update 214 may then cause the removal of the question and associated answer(s).

In another embodiment, knowledge base 122 may have a question associated with obsolete versions of products or services. By way of example, if user 102 asks question 202 regarding an "iPhone," it is unlikely any information related to version one of the iPhone would be of interest to user 102. As a result, update 214 may hide certain answers, such as all answers associated with the first version of the iPhone, unless explicitly requested, or update 214 may simply remove the obsolete versions of any questions and/or answers.

Figure 3:
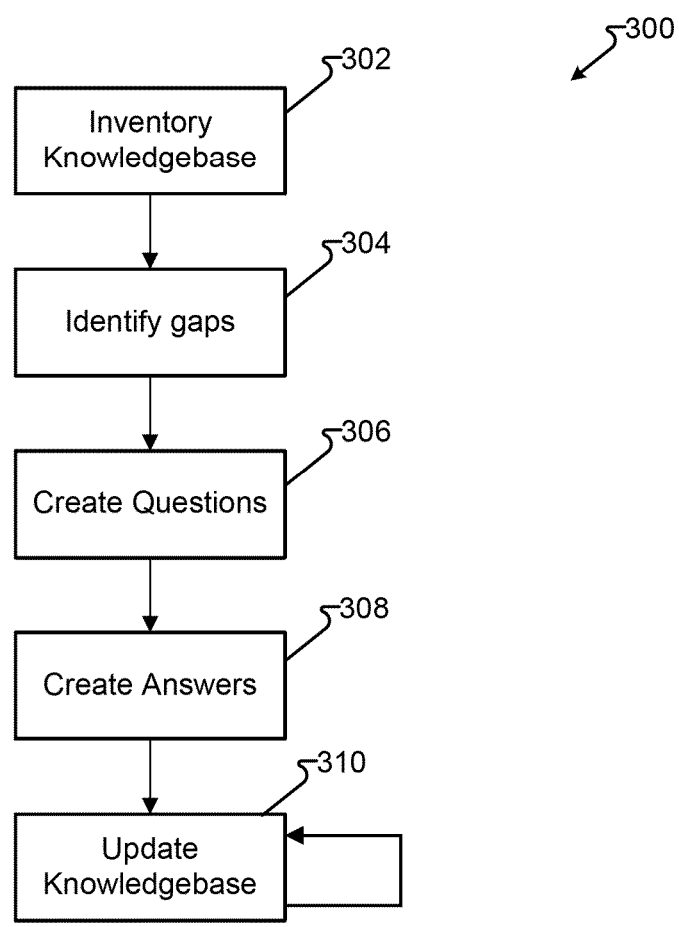
FIG. 3 illustrates a flowchart for updating a knowledge base, in accordance with embodiments of the present disclosure.

FIG. 3 illustrates flowchart 300 for updating a knowledge base, in accordance with embodiments of the present disclosure. In one embodiment, step 302 inventories a current knowledge base, such as knowledge base 122. A processor, such as one executing analysis engine 216, may perform step 302. In other embodiments, a different specialized or general purpose computational machine with appropriate programming instructions performs step 302, 304, 306, 308, and/or 310.

Step 304 identifies gap in the knowledge base. In one embodiment, analysis engine 216 may identify gaps from a variety of external data 226 including, but not limited to, other data repositories within enterprise 112, such as question/answer history 222, personnel information, product and/or service information, and data repositories external to enterprise 112, including websites, social media sites, "Tweets," RSS feeds, data files, dictionaries and so on. Gathered information not covered, or not adequately covered, may indicate a gap. In another embodiment, cross-domain gathered information may indicate a gap based, at least in part, by attributes associated with the information including, but not limited to, severity, quantity, source and the like.

Step 306 attempts to resolve the identified gaps from step 304 by creating questions. The questions may be restatements of the gap or additional processing may provide for normalization, translation, or other reformatting of the gap into a question calculated to address the gap. Step 308 provides questions to appropriate resources for the solicitation of answers. Step 308 may be a routing to internal and/or external personnel or automated systems operable to answer the question. Additional routing and/or processing may provide for screening, revising or approving of the answer prior to execution of step 310.

Step 310 provides the question and answer to the knowledge base. In a further embodiment, step 310 executes in a loop to remove obsolete questions and answers.

It should be apparent to one of ordinary skill in the art that the steps of flowchart 300 may be executed in alternative ordering and/or concurrently without departing from the embodiments described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details.

For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of updating a knowledge base, comprising:
   accessing, by a computer, the knowledge base;
   automatically identifying, by the computer, gap in a coverage of the knowledge base and further comprising, a customer question that resulted in a poor customer satisfaction, the gap in the coverage being further defined as an absence of a question that, if present, would mediate the gap in the coverage;
   generating, by the computer, a request to identify a question to mediate the gap in the coverage;
   generating, by the computer, a request to identify an answer to the question; and
   updating, by the computer, the knowledge base with the question and answer as a question and answer pair.

2. The method of claim 1, whereby, identifying the gap in the coverage of the knowledge base, further comprising, creating an inventory of the knowledge base.

3. The method of claim 1, identifying the gap in the coverage of the knowledge base, further comprising, identifying words or phrases that occur more frequently in an enterprise's domain but are not proportionately addressed in the knowledge base.

4. The method of claim 1, identifying the gap in the coverage of the knowledge base, further comprising, identifying subject matter present in a competitor's publicly available information.

5. The method of claim 1, further comprising, identifying the gap in the coverage of the knowledge base, further comprising, identifying relevant information in a cross-domain data source.

6. The method of claim 1, further comprising, the computer, routing the identified gap in the coverage to an agent to solicit a question from the agent in accord with the identified gap in the coverage.

7. The method of claim 6, further comprising, the computer, routing the question to an agent to solicit an answer to the question.

8. The method of claim 7, further comprising, generating, by the computer, a plurality of question equivalents to the question and the answer.

9. A system for providing information, comprising:
   a processor that executes instructions;
   a knowledge base, accessible to the processor; and
   wherein the processor executes the instructions to:
      identify a gap in a coverage of the knowledge base further comprising, identifying a customer question that resulted in a poor customer satisfaction, the gap in the coverage being further defined as an absence of a question that, if present, would mediate the gap in the coverage;
      generate a request to identify a question to mediate the gap in the coverage;
      generate a request to identify an answer to the question; and
      update the knowledge base with the question and answer.

10. The system of claim 9, further comprising:
    an interface to a network; and
    whereby the processor executes the instructions to access another computer via the network, retrieve information, and identify the gap in the coverage of the knowledge base from the retrieved information.

11. The system of claim 10, whereby the accessed another computer is a web site.

12. The system of claim 10, whereby the accessed another computer is a source of news.

13. The system of claim 10, whereby the accessed another computer is in a domain different from a domain in the knowledge base.

14. The system of claim 9, further comprising, the computer, routing the identified gap in the knowledge base to an agent to solicit a question from the agent in accord with the identified gap in the knowledge base.

15. A method of providing information, comprising:
    receiving a first question from a user, by a computer;
    providing a first answer to the user, by the computer accessing a knowledge base;
    receiving, by the computer, an indication of user satisfaction with the first answer;
    upon determining the user satisfaction requires action, identifying the first question as a gap in the knowledge base, by the computer;
    identifying, by the computer, a second question in accord with the identified gap in the knowledge base;
    identifying, by the computer, a second answer to answer the second question; and
    updating, by the computer, the knowledge base with the first question and second answer, such that receiving the second question, substantially equivalent to the first question, provides the second answer.

16. The method of claim 15, further comprising:
storing the first question and the first answer in a database associated with the indication of user satisfaction; and
the determining that the user satisfaction requires action, further comprises, determining the user satisfaction with one of another question or another answer.

17. The method of claim 15, further comprising, routing one of (a) the second question in accord with the identified gap in the knowledge base or (b) the second answer to answer the second question, to an agent for identifying the respective one of (a) the second question in accord with the identified gap in the knowledge base or (b) the second answer to answer the second question.

18. The method of claim 17, further comprising, the agent ranking one of (a) the second question in accord with the identified gap in the knowledge base or (b) the second answer to answer the second question; and the identified one of (a) the second question in accord with the identified gap in the knowledge base or (b) the second answer to answer the second question, is associated with the highest ranking.

19. The method of claim 15, further comprising:
storing, one of the first question or the first answer in a database;
upon determining the first question has not been accessed for a determined period of time, purging the first question and first answer from the database.

20. The method of claim 15, further comprising,
the identifying of the second answer to answer the second question, further comprises, accessing a source of other domain information, determining at least a portion of the other domain information addresses the second question, and identifying the second answer in accord with the at least the portion of the other domain information.

* * * * *